(12) United States Patent
Koshy

(10) Patent No.: US 12,299,108 B2
(45) Date of Patent: May 13, 2025

(54) USER AUTHENTICATION BASED ON WIRELESS SIGNAL DETECTION IN A HEAD MOUNTED DEVICE

(71) Applicant: Adeia Guides Inc., San Jose, CA (US)

(72) Inventor: Kamal J. Koshy, Aurora, CO (US)

(73) Assignee: Adeia Guides Inc., San Jose, CA (US)

( * ) Notice: Subject to any disclaimer, the term of this patent is extended or adjusted under 35 U.S.C. 154(b) by 98 days.

(21) Appl. No.: 18/088,134

(22) Filed: Dec. 23, 2022

(65) Prior Publication Data

US 2024/0211575 A1 Jun. 27, 2024

(51) Int. Cl.
| | |
|---|---|
| *G06F 21/35* | (2013.01) |
| *G06F 1/16* | (2006.01) |
| *G06F 21/44* | (2013.01) |
| *H04L 9/32* | (2006.01) |
| *H04L 9/40* | (2022.01) |

(52) U.S. Cl.
CPC .............. *G06F 21/35* (2013.01); *G06F 1/163* (2013.01); *G06F 21/44* (2013.01); *H04L 9/3231* (2013.01); *H04L 63/0861* (2013.01)

(58) Field of Classification Search
CPC .......... G06F 21/35; G06F 21/44; G06F 21/31; G06F 1/163; H04W 12/33; H04L 63/08; H04L 63/0853; H04L 63/0861; H04L 63/0876; H04L 63/18; H04L 9/32; H04L 9/3234; H04L 9/3215; H04L 9/3231
See application file for complete search history.

(56) References Cited

U.S. PATENT DOCUMENTS

| | | | |
|---|---|---|---|
| 9,277,334 B1 * | 3/2016 | Wong | H04R 1/1041 |
| 10,255,738 B1 * | 4/2019 | Fernandez | G07C 9/00571 |
| 11,537,201 B1 * | 12/2022 | Puttaswamy | H04N 25/46 |
| 2024/0061918 A1 * | 2/2024 | Wang | G06F 21/32 |
| 2024/0073219 A1 * | 2/2024 | Maizels | G10L 15/25 |

* cited by examiner

*Primary Examiner* — Shaqueal D Wade-Wright
(74) *Attorney, Agent, or Firm* — Haley Guiliano LLP

(57) ABSTRACT

Authentication of a user wearing a head mounted display using wireless channel characteristics, such as wireless channel sounding, is disclosed. A transmission signal from a signal transmitter passes over the face or other parts of the head of the user and is received by a signal receiver, also in, at or near the head mounted display. The input signal received is processed according to the known transmission signal that was transmitted to obtain wireless channel characteristics. Based on these wireless channel characteristics a signal signature is identified, for example, using a machine learning based embedding technique. If the signal signature thus determined matches a signal signature previously associated with the user then the user is authenticated. User access to a resource or action may then be granted automatically.

20 Claims, 9 Drawing Sheets

USER AUTHENTICATION BASED ON WIRELESS SIGNAL DETECTION IN A HEAD MOUNTED DEVICE

BACKGROUND

This disclosure is directed to automated user authentication of a user wearing a head mounted device. In particular, techniques are disclosed for authenticating a user wearing a head mounted device by obtaining wireless channel characteristics and based on these determining a signal signature.

SUMMARY

The present disclosure relates to authentication of a user wearing a head mounted device, such as a head mounted display (HMD), using wireless channel characteristics and, in particular, to generating a signal signature for the user based on the wireless channel characteristics, which may be determined based, at least in part, on wireless signal characteristics detected in a receiver of the HMD. The signal signature can be analyzed to determine an authentication status of the signature (e.g., authenticated vs not authenticated).

Headsets of various types, including head mounted displays commonly used for AR/VR applications, provide a new way to consume content and to interact with other users and network resources. Functions provided by other devices, such as mobile telephones, can be moved to HMDs.

User authentication using methods such as fingerprint, iris, or face detection (using camera and other sensors), PIN, passcode etc. are ubiquitous on electronic devices and for accessing online servers and other resources. Since HMDs are worn on the head, some of the technologies used for authenticating a user of a mobile device or a laptop/desktop computer do not work as well in HMDs due to the difference in form factor. Fingerprint authentication by an HMD would require a fingerprint sensor placed in the HMD, which would be problematic. Also, it may be difficult to enter a PIN and passcode when the user in an AR/VR environment without additional mechanisms including eye tracking etc.

Authentication of users with a high degree of accuracy is, however, needed in HMDs for accessing sensitive information, including financial and personal information or the like, and for interacting with other users. Also, when different users of a household use the same device, authenticating each user separately enables the users to interact with another user or resource and still have the user's identity retained separately.

The receiver of a radio transmission can capture information regarding the wireless channel. Fingerprinting a device based on carrier frequency offset modeling is known. U.S. Pat. No. 10,693,576 ("Carrier frequency offset modeling for radio frequency fingerprinting"), the entire contents of which are incorporated in full herein by reference, describes a machine learning classifier used to determine whether an RF transmission originates from an RF device. The device fingerprinting works based on the fact that each device has a unique RF transmission path. Unlike wired communication, wireless signals travel in a rich scattering environment. Wireless signals are reflected, refracted and diffracted before reaching the receiver device. Due to the different paths available from transmitter to receiver, the signal is said to propagate in a multi-path environment. As a result of a multi-path transmission path for the wireless signal, the transmitted signal, is transformed before receiving at the receiver. The typical transformation applied is $$R = H \times T + n,$$

where R is the received signal,
T is the transmitted signal,
H is the channel transformation matrix, and
n is the noise caused by components in the receiver path.
H corresponds to the impact of the multi-path wireless transmission medium. 'n' is the noise added in any.

Channel sounding and other methods are used on the receiver side to estimate the channel parameter H. The channel parameter H depends on the wireless medium. If the wireless medium changes, this will change the channel parameter H. Wireless channel sounding and processing of parameter values in such a method is known. For example, U.S. Patent Application Publication 2021/0011108, the entire contents of which are incorporated in full herein by reference, discloses a channel sounding method.

Wireless signals have also been used to detect motion. For example, U.S. Pat. No. 10,742,475 ("Method, apparatus, and system for object tracking sensing using broadcasting"), the entire contents of which are incorporated in full herein by reference, describes that wireless receivers can receive the series of probe signals through the wireless multipath channel between the heterogeneous target wireless receiver and the transmitter, and obtain time series of channel information (TSCI) of the wireless multipath channel based on the series of probe signals received. An object associated with the heterogeneous target wireless receiver can then be tracked based on the at least one TSCI. Changes in channel information, called time series channel information (TSCI), is tracked to detect motion. If there are abnormal changes to the TSCI, then motion is understood to have happened. Machine learning algorithms may be used in conjunction to detect the type of motion that has occurred (ex. Human vs. animal).

U.S. Pat. No. 11,092,684 System And Methods For Three Dimensional Modeling Of An Object Using A Radio Frequency Device, the contents of which are incorporated in full herein by reference, describes signal processing to detect changes in a wireless field to detect objects and motion.

Another previous known mechanism for authentication used in mobile phones is Face ID developed by Apple. Face ID entails projecting infrared light to scan a face of a user to build a 3D facial map.

Also known are machine learning-based embedding techniques to identify patterns in large collections of data. U.S. Patent Application Publication 2022/0391633, the entire contents of which are incorporated in full herein by reference, describes methods to generate an image dataset based on object similarity. U.S. Patent Application Publication 2022/0392048, the entire contents of which are incorporated in full herein by reference, describes model training to determine differences between data obtained for object.

Described herein are a method, system, processor-readable medium, and means for performing a method for authenticating a user of a head mounted display using wireless channel characteristics obtained from wireless signals. In an embodiment of such a method, control circuitry receives a request to authenticate a user. For example, such a request may be generated by a user requesting authentication after the user dons the HMD. Or the user may be prompted to authenticate him/herself using the wireless technology described herein, or may be prompted to choose from this or other authentication methods, such as entering a password, and the user may decide to use the wireless method herein described. Other ways of user authentication, for example the user's entry of a username and/or password, digital fingerprints or other types of biometric means of authentication, may be chosen by the user in addition to, or instead of, the method herein described.

As an alternative, a request to authenticate may be automatically generated after it is detected that the HMD is in place on a human head, or may be automatically generated when a user is attempting to access a resource, such as a server or other online resource or, in an AR/VR environment, when the user is attempting to engage in certain types of actions or to interact with some other users. For example, other users may wish to have the user wearing the HMD authenticated before proceeding with further actions with the user, and their query as to the user's identify may initiate the request to authenticate.

In response to the request to authenticate, processing circuitry of a controller may command signal transmitter to initiate transmission of a transmission signal. The transmission signal may be previously stored and may be used each time a signal signature is to be obtained at the receiving side. The transmission signal may be designed as a series of wireless signals, for example, signals transmitted on several radio frequencies over a period of time. More than one antenna may be used by the signal transmitter to provide the transmission signal. According to an aspect of the disclosure, the consistent use of a single transmission signal pattern may facilitate signal processing at the receiving side to identify the signal signature in the received signal.

The transmission signal may be directed toward an inner portion of the HMD or onto the face or other portions of the head of the user. Thus, the transmission path would typically involve scattering of the transmission signal as it is reflected from various surfaces of the head and of the HMD. Some wireless frequencies may enter surfaces, such as the user's skin or internal surfaces of the HMD, more deeply or more readily than others, and while other frequencies, such as shorter wavelength frequencies, would tend to scatter more readily than other frequencies. Since every user's head, including the face, is different, this wireless transmission channel would impart signal characteristics to the signal path sufficient to uniquely identify a user relative to another user. A signal receiver then captures the transmission signal thus scattered as an input signal. While sometimes described as a signal receiver in the singular, it is to be understood that the signal receiver may comprise two or more antennas to capture different frequencies and that the signal receiver may comprise several wireless receivers positioned separately in, on or in proximity to the HMD.

The input signal may be processed using known signal processing techniques to obtain wireless channel characteristics. Signal channel sounding techniques may be used to identify parameter values associated with the channel, including frequency and timing of the components of the transmission signal, and these may be compared with corresponding parameter values of the known transmission signal. A controller may control both the wireless transmitter and the wireless receiver and thus ensure that the transmission signal is known when the input signal is processed. One or more matrices of signal parameter values may be assembled based on the signal channel sounding processing.

Typically, a machine learning-based embedding technique may be used to identify a signal parameter pattern within the matrices of values thus obtained. In a training phase, machine learning techniques are used to train a machine learning model to identify signal patterns within the parameter values of the input signal that uniquely identify a signal path or channel. The signal path or channel would be unique, as determined by the shape, size, proportions and other features of the face and of the head generally, and thus the model would be trained to be able to pick out a user wearing the HMD from another user wearing the HMD.

In addition, the signal path or channel would be shaped by surfaces of the HMD, and especially the inside surfaces of the HMD. Thus, the characteristics of the signal path or channel may be unique also to the specific HMD that is worn by the user. According to an embodiment, a user would be authenticated only when wearing the same HMD initially worn when the user's signal signature was created.

A user may wish to create a signal signature that uniquely identifies him relative to other users. To create a signal signature, the input signal received by the wireless receiver is processed to determine the signal parameter values, and a pattern of parameter values within the parameter values is identified, as explained herein. This identified pattern is saved as the user's signal signature. This signal signature may then be compared to signal signatures obtained in future sessions to authenticate the user.

When the user wears the HMD, the user may be authenticated by comparing a signal signature obtained currently with the signal signature saved for the user. If the authentication is successful at this stage, then the user may be so informed, for example, using the audio-visual system of the HMD, or the user may be informed by allowing access to the resource that the user was attempting to access when the request to authenticate was initiated. Other users and/or online resources may also be notified automatically of the authentication outcome. If the authentication fails, then the user may be given a further opportunity to authenticate using the techniques herein identified or using a different authentication method, such as by entering a password or passcode.

According to an embodiment, the system may automatically detect, based on the obtained wireless channel characteristics, that the head mounted display is incorrectly placed on a head of the user. For example, the obtained wireless characteristics generated from the input signal maybe quite different from signal parameter values previously received, or when identification of a signal pattern as a signal signature is attempted from the obtained wireless channel characteristics the signal pattern may be different, by a difference exceeding a threshold amount, from known signal patterns. This may be sufficient to determine that the HMD is not being worn correctly or is not being worn at all. In response to such a determination, the user may be notified that the HMD is incorrectly placed. Incorrect placement may mean merely that a slight adjusting of the position of the HMD is necessary.

According to an aspect of the disclosure, the signal transmitter, and/or a number of antennas associated with the signal transmitter may be positioned to direct the transmission signal toward an inside of the HMD. The signal transmitter may be positioned inside the HMD and may be affixed thereto. The signal transmitter may include several wireless transmitters comprised in, on or proximate to the head mounted display. The signal receiver may include several wireless receivers in, on or proximate to the HMD. The signal transmitter and/or the signal receiver may be provided in devices separate from the HMD.

The transmission signal may be identical each time for every user. When a second user wears the HMD, a second signal signature may be determined from the input signal characteristics, so that the second signal signature thus obtained could be compared against previously stored signal signatures for other users. According to an embodiment, the transmission signal may vary from time to time because the characteristics of the wireless channel could be determined by comparing the input signal characteristics received with the transmission signal characteristics of the known transmission signal currently being transmitted.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
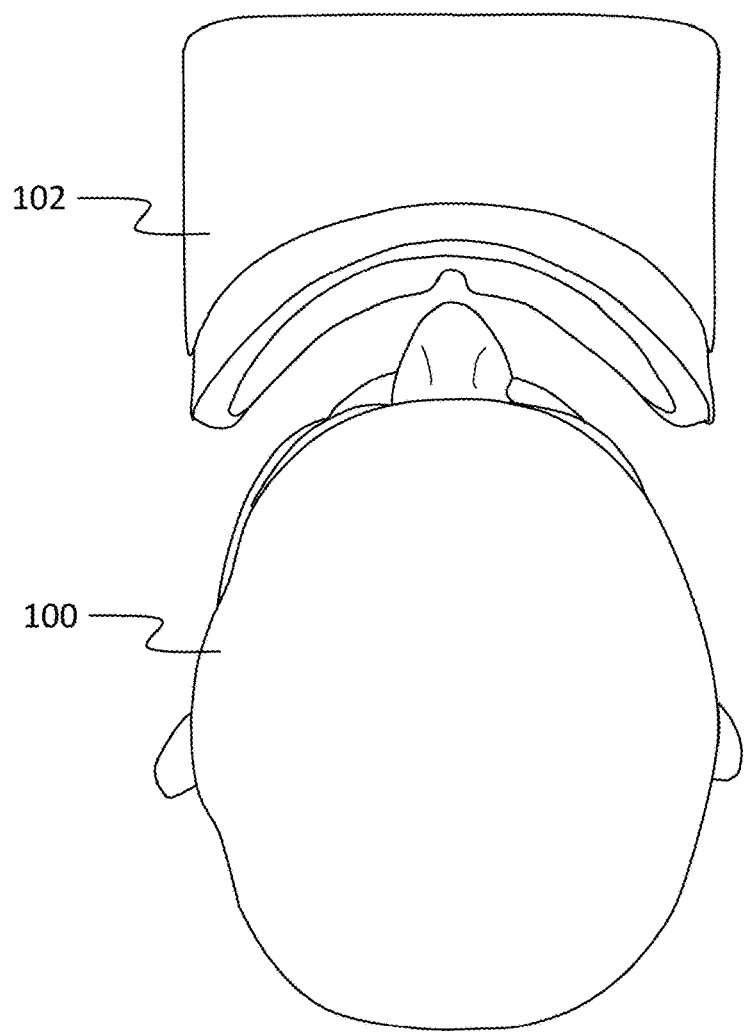
FIG. 1 shows an illustrative example of a head mounted display showing top and front views of the HMD and a top view of a user's head, as known from related art.
Figure 1:
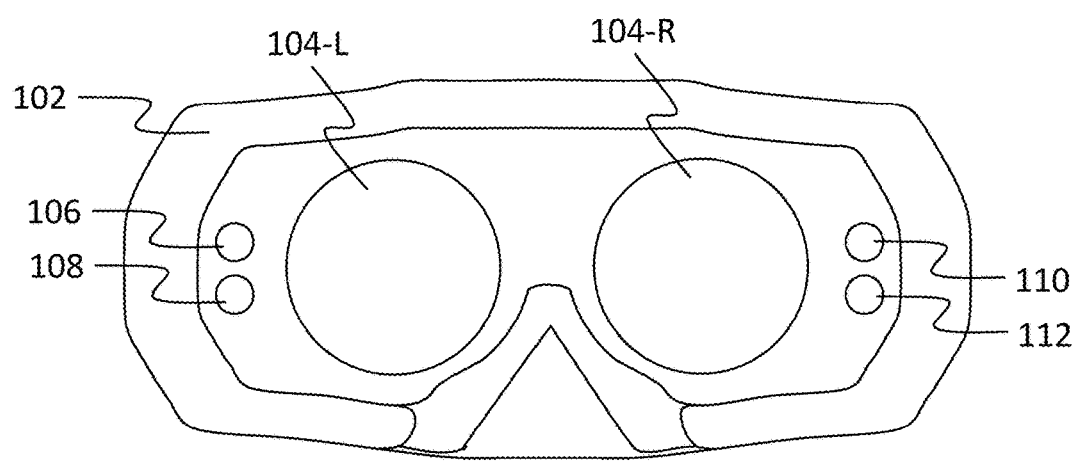

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

As described below, the disclosed techniques enable a system to generate a signal signature for a user utilizing a headset. The signal signature may be generated based, at least in part, on an observed set of relationships between known characteristics of transmitted signals (e.g., transmitted by one or more transmitters in the headset) and observed characteristics of received signals, sometimes referred to as the input signal (e.g., the signal received by one or more receivers in the headset). For example, the system may determine channel state information (CSI) indicating these relationships by analyzing transmitted signals and corresponding received signals. The channel state information may be embodied or indicated in a CSI matrix. The signal signature may be calculated or generated using the observed set of relationships (e.g., quantified or represented by the CSI or CSI matrix) as an input (e.g., to a machine learning algorithm). When a user is first configuring authentication credentials, the signal signature may be stored to memory as a known signature linked to the user. In some embodiments, the signal signature may be generated by transmitting multiple transmission signals, observing multiple received signals, and identifying multiple corresponding CSI sets or CSI matrices. The signal signature may be generated by feeding each of these multiple CSI sets or CSI matrices to a machine learning algorithm, enabling it to better identify a signal signature for the user. After a known signature or signatures has been stored to memory for a user, disclosed systems may authenticate the user by acquiring a candidate signal signature and determining whether or not it sufficiently matches or corresponds to the known signature. Because each distinct user has distinct facial features, when a common set of transmission signals is transmitted, the characteristics of the received signals and the resulting CSI or CSI matrix will be different for each user (e.g., due to different signal reflection and refraction), resulting in a unique signal signature for each user.

FIG. 1 illustrates a head mounted display 102 that may implement, at least in part, the techniques and methods described herein (e.g., the methods 500 or 900) to identify channel characteristics and generate a signal signature, which may be authenticated to verify that the user is a known authenticated user. FIG. 1 depicts a top view of user's head 100 on which a head mounted display 102 is to be mounted. Head mounted display 102 may include displays 104-L (left) and 104-R (right) to create a stereoscopic image by displaying a pair of distinct 2D images (e.g., images of the same scene from slightly different perspectives), which the user may perceive as three-dimensional. A binocular HMD is illustrated, however the technological improvements described herein are also applicable to monocular HMDs, as well as to optical head-mounted displays (OHMDs), which display images and information to users but also allow users to see through them, and to other types of HMDs. OHMDs are sometimes referred to as having optical see-through (OST) functionality. If desired, the HMD 102 may have video see-through (VST) functionality, wherein the HMD 102 captures images or videos (e.g., via a camera—not shown—of the HMD 102 directed to the environment external to the HMD 102) that are then displayed via the displays 104-L and 104-R. Like an HMD with OST functionality, an HMD with VST functionality enables a user to see at least some of his environment (e.g., as if he is wearing glasses). While described as a head mounted display, a helmet mounted display or other such displays and equipment, as well as AR smart glasses, are also intended. Display 104-L and 104-R may be one or more of a liquid crystal display (LCD), amorphous silicon display, low temperature poly silicon display, electronic ink display, electrophoretic display, active matrix display, electro-wetting display, electro-fluidic display, light-emitting diode display, electroluminescent display, plasma display panel, high-performance addressing display, thin-film transistor display, organic light-emitting diode (OLED) display, or any other suitable equipment for displaying visual images. One or more speakers (not illustrated) may also be provided as integrated with other elements of device 102 or may be stand-alone units. Display 104-L and 104-R may be used to display visual content while audio content may be played through speakers. A user input interface may also be integrated with or combined with or be in wireless communication with display 104-L and 104-R. Also shown in FIG. 1 is a pair of wireless transmitters 106, 108 and a pair of wireless receivers 110, 112 positioned on either side of the displays 104-L and 104-R. While specific locations are illustrated for the wireless transmitters 106, 108 and wireless receivers 110, 112, it will be understood that they may be positioned elsewhere in, on or near the HMD and that more than two or fewer than two wireless transmitters and wireless receivers may be provided.

Figure 2:
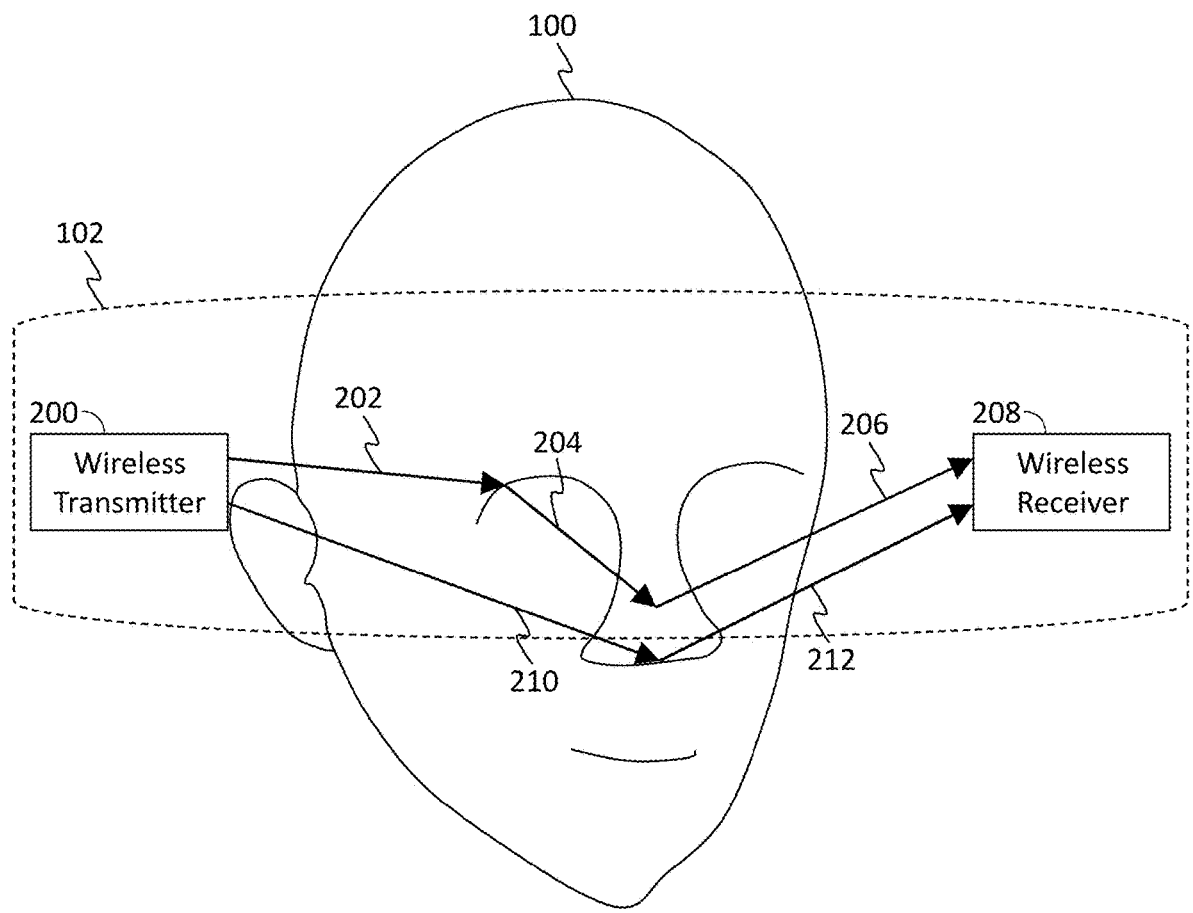
FIG. 2 shows an illustrative example of a wireless transmitter, a wireless receiver and a transmission path between the wireless transmitter and the wireless receiver.

FIG. 2 is an example schematic diagram of the HMD 102 (also shown in FIG. 2) according to an embodiment, illustrating an example wireless transmitter 200 and a simplified depiction of a wireless signal transmission path that entails portions 202, 206 and 210, 212. Also shown in FIG. 2 is a wireless receiver at 208. Wireless transmitter 200 and a wireless receiver 208 may be comprised as part of head mounted display 102. Wireless transmitter 200 and wireless receiver may be provided as operating on the Wi-Fi or Bluetooth radio range. The communication path includes the transmission signal 202 and a reflected portion 206 of the portion of transmission signal reflected portion 206 is reflected off head portions of the user, the face being part of the head, and/or off surfaces, such as interior surfaces of the HMD. Some reflected portions 206 may be reflected more than once off of such head and HMD surfaces before reaching wireless receiver 208. While described as reflections, it will be understood that transmission signal may also be refracted, diffracted, scattered and/or attenuated before reaching wireless receiver 208.

Figure 3:
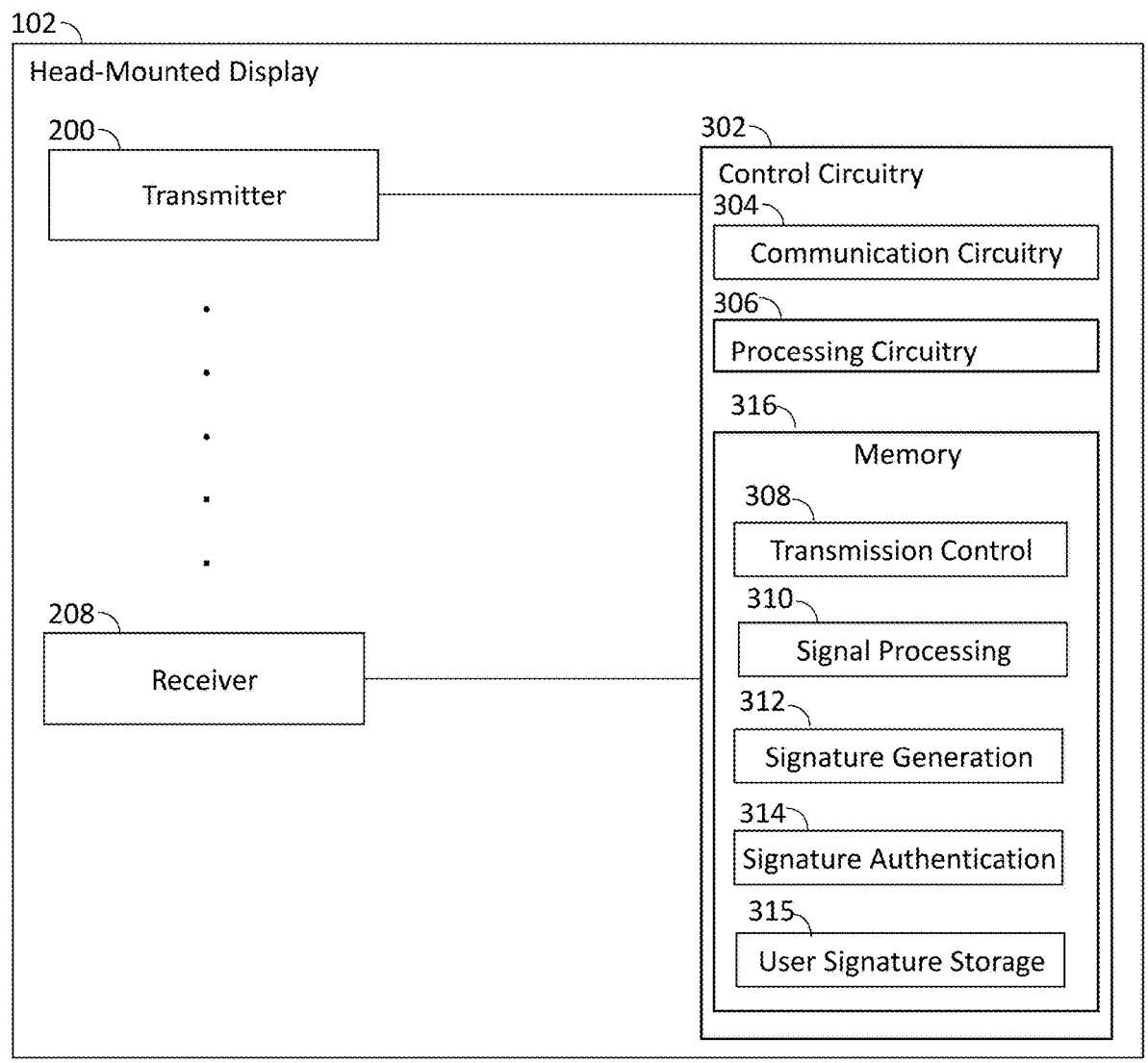
FIG. 3 shows an illustrative example of components of head mounted display, including a transmitter a receiver and a control circuitry, according to an aspect of the disclosure.

FIG. 3 shows an illustrative example of a schematic diagram of example components of an example of the HMD 102 (also shown in FIGS. 1 and 2) according to an aspect of the disclosure. FIG. 3 illustrates these components as being part of, or as being integrally formed with, the HMD 102, however it will be understood that one or more of the illustrated components may be provided as separate components not included in the HMD 102 or may be implemented via the cloud, depending on the embodiment. Depending on the embodiment, the HMD 102 may include components not shown in FIG. 3.

FIG. 3 illustrates the wireless transmitter 200 in wireless communication with the wireless receiver 208. The communication may be conducted via radio frequency, infrared, microwave, or other types of wireless communication and may be provided as two-way communication between the components designated as the wireless transmitter 200 and the wireless receiver 208. The wireless transmitter 200 and wireless receiver 208 may also communicate bidirectionally using a wired or wireless connection via control circuit 302 to which they both may be connected. In an embodiment, the wireless transmitter 200 may be the same unit that is used by the HMD 102 to communicate with Wi-Fi or cellular networks. In an embodiment, the HMD 102 uses a different transceiver or radio for wireless communication via Wi-Fi networks or cellular networks than it does for transmitting or receiving the signals used for signal signature generation and authentication. The wireless receiver 208 may be the same receiver used by the HMD to communicate with Wi-Fi and or cellular networks. The wireless transmitter 200 and wireless receiver 208 may comprise their own control circuitry, including chips, and may comprise one or more antennas. In addition, more than one transmitter and more than one receiver may be provided as part of HMD 102, or extraneous to the HMD 102, to perform the processing herein described.

The control circuitry 302 may be provided as a separate unit as part of head mounted display or a part of a head mounted display. The control circuitry 302 may be integrated with the receiver 208 or with the transmitter 200 or portions maybe one while other portions may be integrated with the other. One or more units of control circuitry may be implemented as software, firmware, hardware or as a combination of the foregoing.

The control circuitry 302 includes the communication circuitry 304 to handle communication, for example, wired communication, with the transmitter 200 and the receiver 208. The control circuitry 302 may also include the processing circuitry 306.

The processing circuitry 306 may invoke transmission control 308, which may be a software module stored in the memory 316. For example, the transmission control 308 may instruct transmitter 200 as to a transmission signal timing and pattern. The processing circuitry 306 may also include invoke signal processing 310 to handle signal processing of the input signal received by receiver 208. For example, signal processing 310 may be a software module that analyzes the received input signal and identifies wireless channel characteristics, including signal frequency and delay. Such signal processing may take into account the known transmission signal transmitted by the transmitter 200, for example, to determinate a relationship between the transmission signal and the received input signal, which may be embodied or represented by the wireless channel characteristics. For example, the control circuitry 302 may command transmitter 200 via a wired connection as to the transmission signal, including its radio frequencies, timings and other properties.

Based on the signal characteristics thus identified by signal processing 310 and the known transmission signal, signature generation 312 may discern a pattern of channel characteristics. This pattern may be unique relative to the pattern of other channel parameter sets because the channel characteristics are unique to the physical features of the user wearing the HMD. This pattern may be sufficient to generate a signal signature, which may also be thought of as a channel signature, that uniquely identifies the user wearing the head mounted display relative to other users who wear the head mounted display. The signal signature that is thus generated by signature generation 312 is saved in memory 316 and associated with the user wearing the head mounted display.

The control circuitry 302 also includes signature authentication 316, which can authenticate a user by comparing the signal signature that is generated for the current head mounted display wearer against a signal signature previously generated and stored in memory 316 and associated with the user. The signal signatures stored to memory may be referred to as "known signal signatures" or "known signatures." When a signal signature is acquired for the purpose of determining whether or not it should be authenticated, the signal signature may be referred to as a "candidate signal signature" or a "candidate signature." Once a candidate signature is authenticated, it may be referred to as an "authenticated signal signature" or an "authenticated signature."

The control circuitry 302 may send and receive commands, requests, and other suitable data to the wireless transmitter 200 using a wired path or using a wireless path. Similarly, the control circuitry 302 may send and receive commands, requests, and other suitable data to the wireless receiver 208 using a wired path or using a wireless path. One or more of the components shown as part of the control circuitry 302 may be provided as software, firmware, hardware or as a combination of the foregoing, and may be provided separately as part of other components or as standalone components. For example, one or more of transmission control 308, signal processing 310, signature generation 312, and/or signature authentication 314 may be provided as hardware components. The processing circuitry 306 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry 306 may be distributed across multiple separate processors or processing units, for example, multiple of the same type of processing units (e.g., two Intel Core i7 processors) or multiple different processors (e.g., an Intel Core i5 processor and an Intel Core i7 processor). An application on a device may be a stand-alone application implemented on a device or a server. The application may be implemented as software or a set of executable instructions. The instructions for performing any of the embodiments discussed herein of the application may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). In some embodiments, an application may be a client-server application where only the client application resides on the control circuitry 302, and a server application resides on an external server, which may be a part of a local area network or may be part of a cloud computing environment accessed via the Internet.

The memory 316 may be an electronic storage device that is part of the control circuitry 302 or may be a standalone device. The memory 316 may be understood to mean any device for storing electronic data, computer software, or firmware, such as random-access memory, read-only memory, hard drives, optical drives, solid state devices, or any other suitable fixed or removable storage devices, and/or any combination of the same. Nonvolatile memory may also be used (e.g., to launch a boot-up routine and other instructions). Cloud-based storage may be used to supplement the memory 316 or instead of the memory 316.

The control circuitry 302 may include display generating circuitry to provide prompts and feedback to the user regarding the authentication process using the audio/visual system of the HMD. Control circuitry 302 may provide overall control of the HMD, including displays and audio-visual systems, access to networks, such as the internet, and other applications.

Returning to FIG. 2, the wireless receiver 208 may receive content and data via signal transmission path 202, 206 and 210, 212 as well as from other wireless transmitters of the HMD 102 or working in concert with HMD 102 for wireless authentication. In addition, these wireless paths may include scattered wireless paths in, through and near the HMD 102 and the user not illustrated. Also, the wireless receiver 208 may be provided as part of the HMD 102 or as part of an ancillary device, as more than one signal receiver working in concert and may be positioned near each other or elsewhere in, on, or proximate the HMD 102 or the user, or elsewhere. For example, one or more wireless receivers of another digital device (e.g., a Bluetooth earpiece or headphone, watch, smartphone, tablet, laptop or desktop or other portable or stationary device) may serve as the wireless receiver 208 of the input signal herein described, or may serve as the wireless transmitter 200. The wireless receiver of such an additional device may be provided in addition to, or instead of, the wireless receiver 208, or may be provided in addition to, or instead of, the wireless transmitter 200. The wireless receiver of such an additional device may be controlled by the control circuitry 302, so that processing circuitry 306 may perform the signal processing and the like, or the device in which such wireless additional wireless receivers are located may perform some or all of the processing.

According to an embodiment, user authentication may entail both the matching of a signal signature of the user wearing the HMD against a previously stored signature and user entry of user identification. For example, the control circuitry 302 may cause display of a prompt on the visual display of the HMD asking the user to speak or otherwise indicate his or her name, password or other user identifier or credential as part of the user authentication process. If spoken, this name, password, other identifier or credential (hereinafter "user identifier") may be transcribed and stored as data. Encoding circuitry (e.g., for converting over-the-air, analog, or digital signals to audio signals for storage) may also be provided. The user identifier may then be used as follows. First, in the user signal signature generation process, the control circuitry 302 would obtain a signal signature for the user wearing the HMD and would prompt the user to provide a user identifier. The signal signature would be stored in the memory 316 in association with the user identifier. Second, in the user authentication process, control circuitry 302 would obtain a candidate signal signature from the user wearing the HMD and would prompt the user to enter the user identifier. Authentication may succeed when the candidate signal signature currently obtained from the user matches the known signal signature stored in association with the user for whom the user identifier was received. Further, the user may enter user identification on another device in wired or wireless communication with the HMD. For example, the user may be prompted to enter user identification, and the user would enter user identification on a smartphone/tablet or other device, which would communicate this information via a Wi-Fi router or via the cloud or via Bluetooth connection to the HMD control circuitry 302. In some instances, the user does not need to enter an identity separate from the authentication process. The disclosed systems (e.g., the HMD 102) may simultaneously identify and authenticate by acquiring a candidate signal signature and determining it corresponds to a known signal signature for the user.

Figure 4:
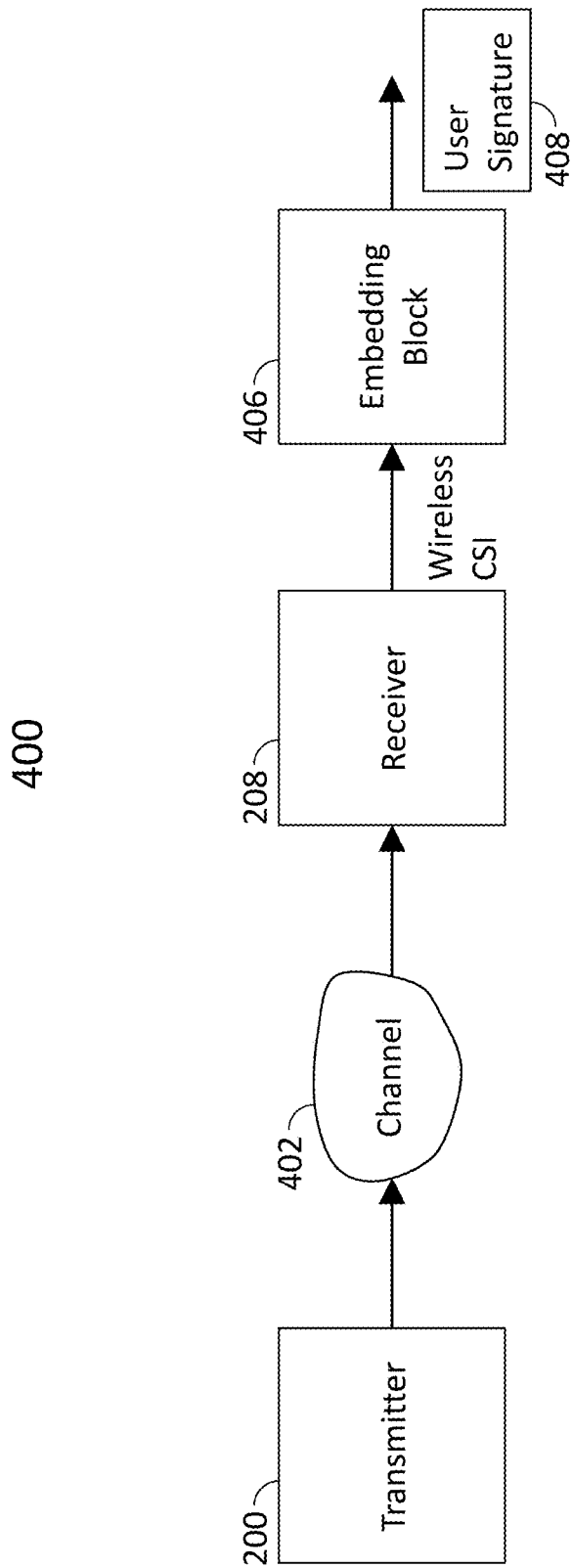
FIG. 4 shows an illustrative example of components at a high level performing a method according to an aspect of the disclosure.

FIG. 4 shows an example process 400 for capturing a signal signature of a user wearing an HMD (such as the HMD 102 shown in FIGS. 1 and 2), according to an embodiment. The process 400 may be implemented, in whole or in part, by one or more of the devices or systems described herein, such as the HMD 102. The wireless transmitter 200 transmits a wireless transmission signal via the wireless channel 402 to the wireless receiver 404. The transmission signal, transmitted via the wireless channel 402, may experience reflection, reflection, diffraction (hereinafter sometimes referred to as "scattering") off of portions of the head and/or HMD 102, including the nose, chin, glasses and other user features, as well as off of surfaces, including internal surfaces, of the HMD, of the transmission signal before reception. The signal received by the wireless receiver 208 is processed as the input signal by the control circuitry 302. The control circuitry 302 knows the transmission signal pattern, including its one or more frequencies and timings, and processes the received input signal. This process may be channel signal sounding to obtain data regarding the wireless signal propagation environment. As part of the signal processing, channel state information (CSI) regarding the channel properties of the communication link is obtained by identifying channel parameter values (sometimes referred to as channel characteristics) of the input signal received in relation to the known transmission signal. A distinctive pattern in these channel characteristics may be identified to determine a signal signature, which in turn may be used to uniquely identify a user relative to other users of the HMD.

In some instances, multiple signal signatures may be determined for each user and stored as known signatures. Determining whether a candidate signature corresponds to a known signature may include determining a "distance" from a candidate signature to one or more clusters of known signatures. In such an example, each cluster of known signatures may correspond to a different user (e.g., a user may have multiple similar known signatures).

In some instances, to determine a signal signature, a cluster or some pattern of data may be identified in one or more matrixes of signal channel parameters. For example, a signal signature may be determined based on wireless channel characteristics (e.g., quantified by a CSI matrix) obtained from multiple distinct sets of transmitted and received signals. For example, a user's face might be "scanned" multiple times during the signal signature generation process. For each scan (e.g., wherein one or more signals are transmitted and received as input signals), wireless channel characteristics may be determined. A known signal signature for a given user may be determined based on these multiple sets of wireless channel characteristics. A second user may go through a similar process. As a result, each user may have a different cluster of sets of wireless channel characteristics that have been determined.

As also shown in FIG. 4, a machine learning-based embedding process may be used at embedding block 406 to identify a cluster or other pattern of data that is sufficient to uniquely identify a user relative to other users. The captured signal signature may be saved as a known signal signature 408 for a particular user in a user registration phase. A candidate signal signature captured in a subsequent session may be compared against a previously saved signal signatures in an authentication phase.

Figure 5:
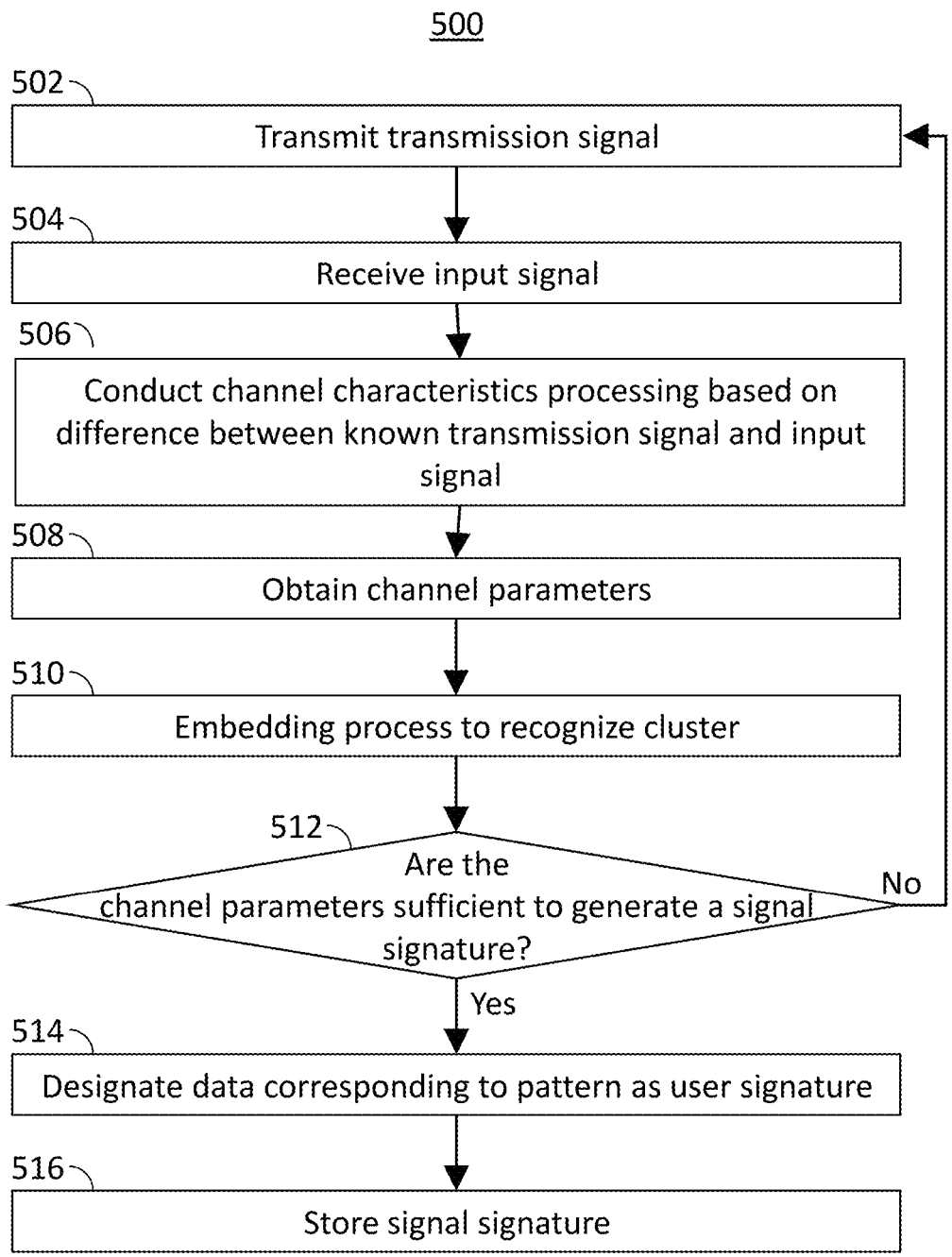
FIG. 5 shows an illustrative example of a flow chart for generating a signal signature based on a transmission signal received, according to an aspect of the disclosure.

FIG. 5 illustrates aspects of a signal signature generation process or method 500 for generating a known signal signature for a new user, which can later be used to authenticate the new user, according to an aspect of the disclosure. The method 500 may be implemented, in whole or in part, by one or more of the devices or systems described herein, such as the HMD 102. According to an aspect of the disclosure, during an initialization phase, user may be asked for permission to wirelessly scan the user's face for authentication. Due to multiple reflections from the face and other portions of the head, the user may be prompted to remove accessories such as glasses, nose rings and the like because accessories may cause multiple delayed time instants in the input signal.

According to an embodiment, and new user may automatically be detected after the user puts on the HMD because the signal signature obtained from the new user would be recognized as a proper signature pattern but the signal signature could not be successfully matched against any previously stored signal signature. Accordingly, the user may be prompted for permission to initiate a wireless scan to generate a signal signature for the user. In the alternative, the wireless scan may be initiated only after the user has authorized the wireless scanning.

As part of this user registration or initialization phase, at 502, the wireless transmitter 200 sends a known transmission signal pattern, which is received by the wireless receiver 208. The transmission pattern may be encoded in single carrier frequency, or multi-carrier technologies like OFDM, OFDMA, etc. In addition, there may be different simultaneous streams of known patterns sent by the transmitter 208 using MIMO technologies. Design considerations within the HMD may address the elimination or suppression or mitigation of coupling paths and impedance. Such coupling of the transmitter and the receiver and other wired coupling paths should be kept to a minimum.

At 504, the input signal is received by wireless receiver 208. If there are several receiving antennas, the input signal may be a composite of the signals received at all of the antennas.

At 506, wireless channel sounding techniques, which involves a frequency domain method of understanding the channel, may be used to obtain wireless channel characteristics. Another way to quantify the wireless channel is to look at the impulse response (the response from sending an impulse at the transmitter). Impulse response is a time domain method of understanding the wireless channel The impulse response would characterize the different reflected components and an example illustration is shown below.

The received signals may have components at different time instants and may be delayed with respect to the transmitted signal due to the different reflections from the facial features. If there are multiple reflections before reaching the receiver, the signal would be attenuated and delayed compared to a signal path that goes through a single reflection. In addition, relative composition of reflection, refraction and diffraction would vary based on the frequency of the wireless signal. Different skin and facial features have different reflectance to wireless and electromagnetic radiation at different frequencies. Due to the different reflection characteristics and the difference in facial features, at different frequencies, the channel sounding characteristics will be different for different users. These differences may be used to differentiate and uniquely identify users.

Signal processing may automatically be initiated upon receipt of the input signal. To determine wireless channel characteristics, an input signal may be compared with the known transmission signal. Such a process may use wideband or narrow band transmission signals. A channel state information (CSI) matrix of parameter values may be assembled and stored for the channel based on the received input signal and the known transmission signal. The received channel sounding parameter values may be stored locally or remotely and then processed to generate a signal signature.

Response to an emulated impulse wave may be used to generate the time delayed response pattern, and this can in turn be used for differentiating between users.

At 508, channel parameter values are obtained based on the processing performed. The channel parameter values may reflect parameters such as changes, compared with the transmission signal, of frequencies and of signal delays.

A machine learning based embedding process may be used to identify patterns of parameters of channel characteristics, as shown at 510. In a learning phase, the model may have been trained using a large set of training data to identify a pattern within the channel parameter values sufficient to uniquely identify the user. The training set of samples would be used to train the model of the embedding algorithm to separate out users. A machine learning-based embedding technique uses as a classifier, which may be trained in any suitable way. For example, in some embodiments, the ML classifier may be trained, in a supervised manner, from a set of patterns in labeled channel parameter value sets to recognize distinct user patterns. In an application phase, data that is sent to the machine learning algorithm may also be pre-processed to remove noise, normalize inputs and the like as part of standard machine learning techniques.

At 512 it is determined whether the channel parameter values are sufficient to generate a signal signature. If the model is unable to identify a signal pattern with a sufficiently high confidence level to generate a signal signature ("No" at 512) then the process may return to step 502, where a new transmission signal may be transmitted to try again to obtain a signal signature. On the other hand, if at 512 a signal signature is successfully captured ("Yes" at 512) with a sufficiently high confidence level, then processing continues to 514. A confidence level for identifying a signature may be set for the model using known standards for classifiers in the machine learning field. At 514, the pattern is designated as a signal signature and may be configured in a signal signature format for later comparison. The signal signature is saved in memory at 516. A signal signature may be stored in the cloud in addition to, or instead of, locally in memory 516.

In an embodiment, storage in the cloud may facilitate user authentication when the user uses replaces the HMD or when the user otherwise uses similar equipment. According to an embodiment, wireless scanning may be periodically performed during a user session with the HMD to generate additional signal signatures of the user. This may be used to improve the accuracy of detection of the user by fine-tuning the signal signature.

In an embodiment, movement of eyelids may be detected so that the presence of a real human may be distinguished from the presence of a mannequin. In this embodiment, in the channel characteristics stage, the CSI matrix would reflect eyelid movements. For example, eyelid movements may be detected as small doppler changes, which would be picked up in the input signal and represented in the CSI matrix. The machine learning model may be trained with users with eyelid movement.

Figures 6, 7:
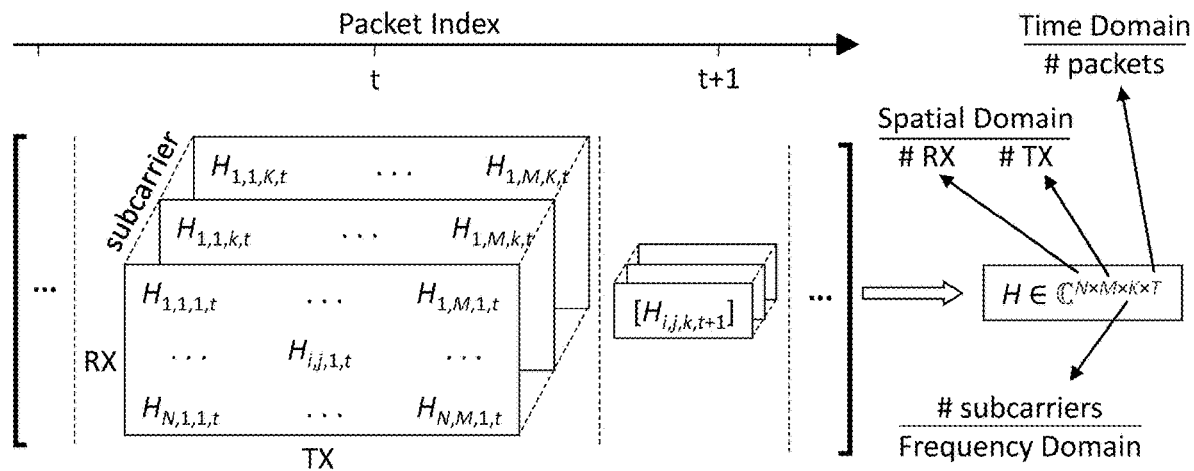
FIG. 6 shows an illustrative diagram of channel characteristics or characteristics obtained from the input signal received by the receiver, according to what aspect of the disclosure.
FIG. 7 shows an illustrative example of a wireless parameter matrix with the channel characteristics or characteristics generated based on the input signal, according to an aspect of the disclosure.

Returning to the signal processing step, as illustrated in FIG. 6, one of the axes for capturing wireless characteristics may be time and the other may be axis frequency. For an OFDM system, both of these axes would be used.

FIG. 6 shows illustrative data structures of wireless signal characteristics, in accordance with some embodiments of this disclosure. In some embodiments, the wireless signal-sensing application may determine wireless signal characteristics based on one or more of channel state information (CSI), Received Signal Strength Indicator (RSSI) and received channel power indicator (RCPI). For example, MIMO (Multiple Input Multiple Output) technologies, e.g., MIMO-OFDM, multi-user MIMO may enable multiple devices to communicate with wireless receiver 208 simultaneously, or single-user MIMO, which may provide CSI for each corresponding set of transmit and receive antennas for particular carrier frequencies. Wireless signals may propagate from the transmitter to the receiver at certain carrier frequencies along multiple paths, and a time series of CSI measurements capturing how wireless signals travel through surrounding objects, in this case features of the head of the human user, in time, frequency, and spatial domains may be determined and used to generate channel parameter matrixes as shown in FIG. 7. In some embodiments, a time series of wireless signal information (e.g., CSI, RSSI, RCPI) may be analyzed.

The CSI data may correspond to a three-dimensional matrix of values corresponding to a number of transmitting antennas (Tx), a number of receiving antennas (Rx) and a number of subcarriers, and may be indicative of amplitude and phase variation of a channel within a frequency used in the wireless transmissions, as shown in FIGS. 6 and 7. In the example of FIG. 6, H may represent the CSI matrix, Rx-Tx may represent a receiving and transmitting antenna pair, M and N may respectively represent a number of transmit and receive antennas in a MIMO-OFDM channel, K may represent a number of subcarriers in the frequency domain, and T may represent a number of packets in the time domain. An example of values for these variables may be 2 for #RX and for #TX, 128 for #subcarriers, and 10 for the #packets.

In some embodiments, matrixes similar to those of FIG. 7 may be generated, and may store channel information based on more than one transmitting and more than one receiving antenna. Such channel characteristics generated for one or more users may be added to a database stored in the memory 316. This database may be located in user signature storage 315, a storage area in which known signal (channel) signatures of one or more users may be stored. In some embodiments, data structure may be configured to store indications of certain time points in the historical wireless signal characteristics at which the user is detected, which may be used to confirm the times, in connection with CSI matrix shown in FIG. 7, of when a user is present (e.g., and watching TV). Thus memory 316 may retain a history of the presence of each user, which may be later used to authenticate the user. For example, the user may be prompted to input the most recent one or more times the user used the HMD.

The superscript may be used to denote different transmit/receive antenna combinations, as shown in the matrices of channel parameter values of FIG. 7. One of the axes for capturing wireless parameters may be time and the other axis frequency. For an OFDM system, both axes would be used. In addition, the superscript can be used to denote different transmit/receive antenna combinations. The number of elements in the matrix of FIG. 7 is merely a representative example to illustrate concepts and in a real system the generate wireless characteristics may be much higher. A smaller matrix is shown here only for ease of representation. Subscript 1 may indicate #packet, subscript 2 may indicate the #subcarriers, and superscript may indicate the #combination of RX and TX.

FIG. 7 shows the CSI matrix of the signal channel. Some of the key items that can be derived from CSI matrix are:

1. RSSI (Received Signal strength indicator)
2. Frequency and timing shifts.
3. Doppler shift
4. Changes in fading patterns.

Returning to the machine learning embedding technique, such a technique may be used to find a pattern in a larger data set. For example, the training may be performed from a set of labeled user facial/HMD patterns in which the label for a particular pattern indicates a distinct user. The training set of labeled patterns may include tens or hundreds of thousands of wireless channel parameter value sets. Example techniques for embeddings are using a traditional distance vector calculation in KNN (K-nearest neighbors), PCA (Principal component analysis) and t-SNE (t-distributed Stochastic Neighbor Embedding).

Figure 8:
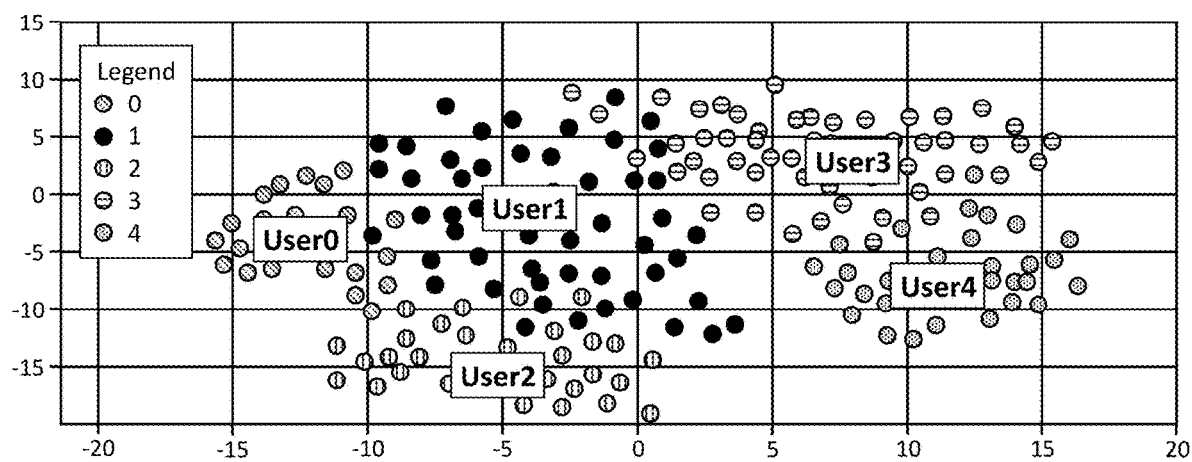
FIG. 8 shows an illustrative example of clusters identified by a system, each cluster embodying a signal signature for a respective user, according to an aspect of the disclosure.

In this connection, FIG. 8 shows a transformation of the high-dimensional wireless parameter data into a two-dimensional space using t-SNE. A tool to visualize high-dimensional data, t-SNE converts similarities between data points to joint probabilities and tries to minimize the Kullback-Leibler divergence between the joint probabilities of the low-dimensional embedding and the high-dimensional data.

Clustering type properties may be used to see the distance between a new signal signature pattern and one of the stored signal signature patterns. Known user signal or channel signature patterns may be stored in user signature storage 315 of the memory 316. Candidate signatures generated may be compared, as part of the automated real time process, against each of the known user signatures stored in the user signature storage 315. At the same time, the authentication process may be sufficiently flexible or permissive to allow for some variation in the signal channel characteristics or channel characteristics. This is because the input signal, even if based on the same transmit signal and even though the HMD is being worn by the same user, may vary slightly as a result of glasses being worn by the user, state of facial hair of the user, piercings, jewelry or other accessories being worn by the user, perspiration on the skin, slight movements of the wireless transmitter 200 and/or of the wireless receiver 208, ambient humidity, signal interference and other such factors. Any pattern that falls within or sufficiently close to a cluster or other family of patterns of the potentially many and varied signal channel characteristics or channel characteristics that thus may be identified by the embedding process may be sufficient to be deemed a proper signal signature.

Figure 9:
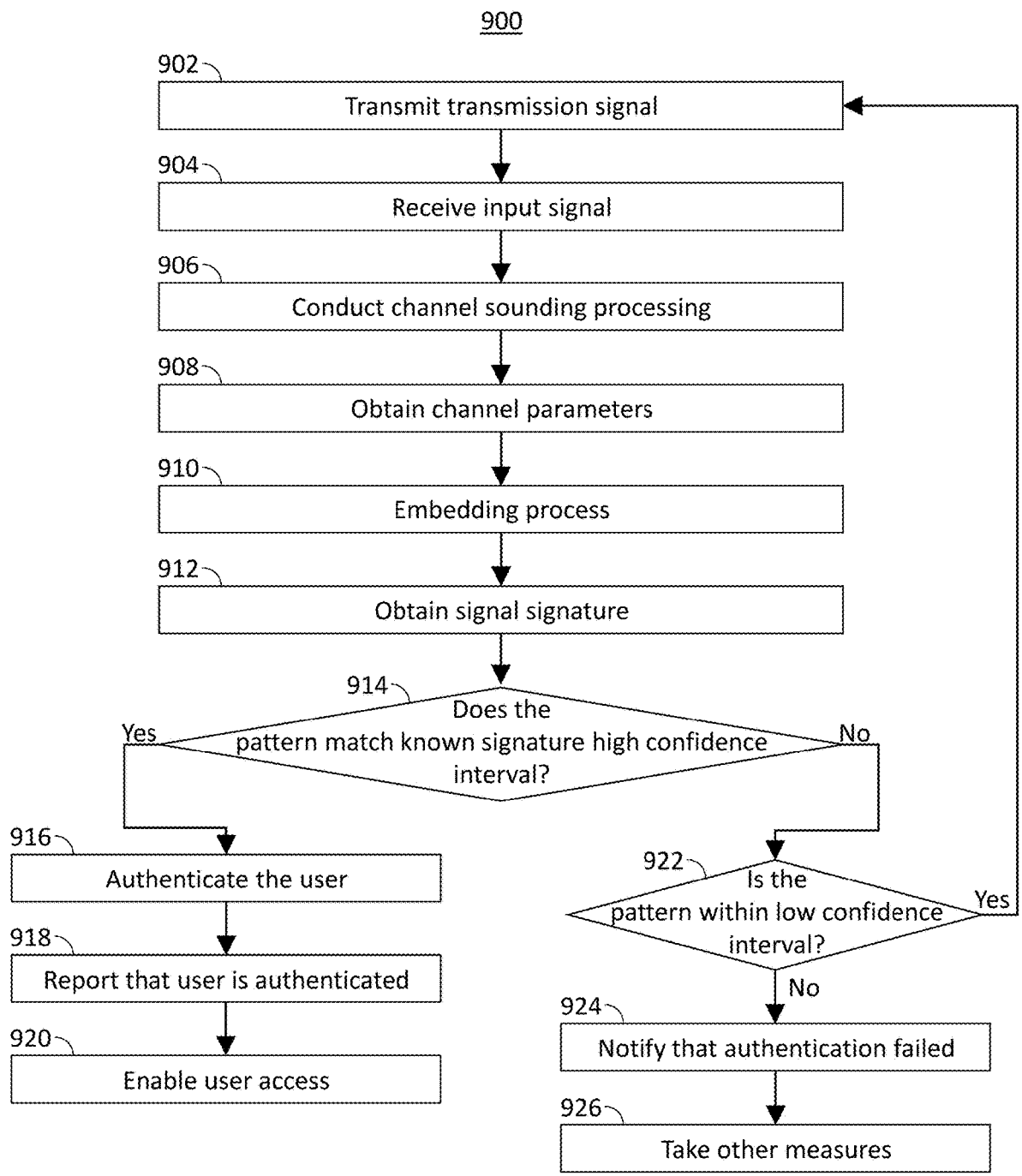
FIG. 9 shows an example of a flow chart for user authentication based on a comparison of signal signature, according to an aspect of the disclosure.

FIG. 9 illustrates a process 900 of authorizing a user wearing an HMD. The process 900 may be implemented, in whole or in part, by one or more of the devices or systems described herein, such as the HMD 102. At 902, the wireless transmitter 200 transmits a transmission signal, as described herein with respect to FIG. 5. At 904, the wireless receiver receives the transmission signal, as discussed above. At 906, a channel sounding processing may be conducted to obtain and to store wireless channel signal parameter values at 908. This may be accomplished using methods described above in connection with FIG. 5. A matrix of such parameter values may be generated, and this step may be followed at 910 by a machine learning based embedding process to identify a pattern within the parameter value data; such a pattern may yield a signal signature, as shown at 912 and as described above for FIG. 5.

At 914 it is determined whether the pattern thus identified matches a known signal signature within a high confidence interval. If so ("Yes at 914), then at 916, the user is authenticated and this authentication at 918 is reported to the user. Accordingly, at 920, user access to a resource, such as an online resource or to certain interactions in an online environment or in an AR/VR environment, is enabled. Additional nodes or other devices, such as HMDs associated with other users, may also be notified of the successful authorization or of the fact that the user is now permitted access.

On the other hand, if the signal pattern identified does not match with a high confidence level a signal signature that was previously stored in memory ("No" at 914), then at 922 it is determined whether the pattern is within a low confidence interval. If so ("Yes at 922), this may mean that the transmission/receiving process failed, for example, that there was some interference in the signal path or that the HMD was not properly placed on the user's head. Accordingly, processing returns to 902 where another transmission signal is transmitted and another signal signature is obtained, as described in the foregoing. Additionally, the user may be prompted to adjust the HMD.

If the pattern is determined at 922 to be above a low confidence interval ("No" at 922), then at 924 the user is notified that authentication has failed. This may mean that a proper signal signature was obtained for the user but that the signal signature does not match a known previously stored signal signature. Thus at 926 additional measures may be taken, for example, the resource or user with which the user sought to engage and for which authentication was sought, is notified that the user is not given access. Such resources may then be blocked for the user.

As part of this authentication process, a distance between stored user signal signatures and the signal signature newly obtained may be used to authenticate the user if the newly obtained signal signature is within the confidence interval required for authentication. In addition, statistical techniques can also be implemented instead of machine learning algorithms or in conjunction with machine learning algorithms, looking at the properties of the data on a per user basis, and used to distinguish between users.

Figure 10:
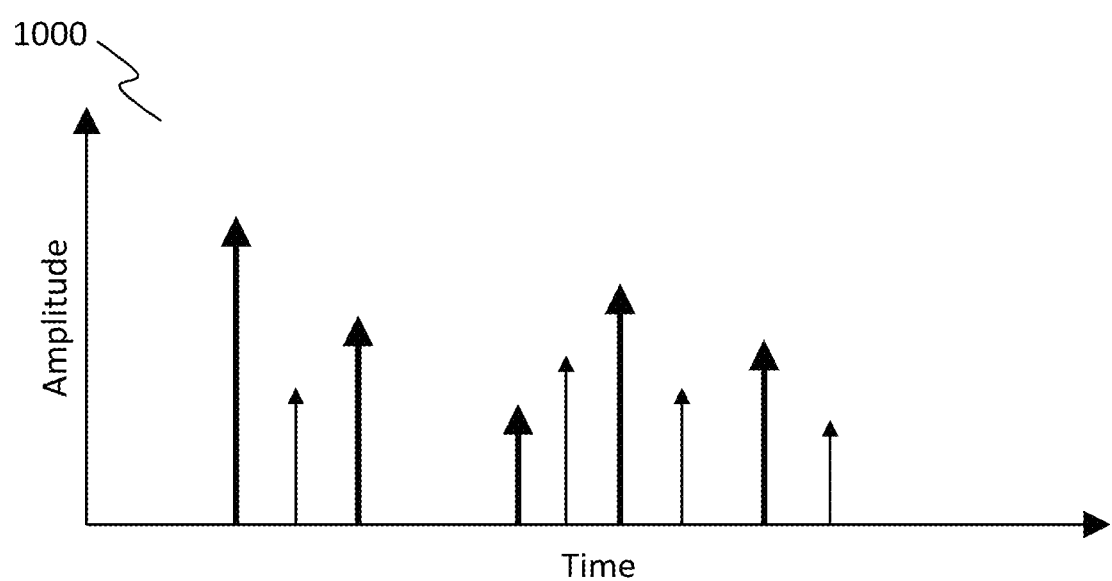
FIG. 10 shows an illustrative example of differences in impulse response between the facial features of two different users, according to an aspect of the disclosure.

FIG. 10 illustrates a difference in impulse response between the facial features of two different users. This difference is caused by the difference in facial features as well as the difference in reflectivity for different skin types or the like for users. Values obtained from the signal signature of the first user (shown in FIG. 10 as thicker arrows) differs from those of user 2 (shown as thinner arrows). The differences may be quantified and if the quantified differences exceed a threshold then the signal signatures may be deemed to be from different users. A machine learning based embedding process may return merely a number indicating a confidence level that two signal signatures are of the same user and thus may authenticate the user, or that they do not match with a sufficiently high confidence level, and thus may indicate that authentication failed.

Continuous tracking may be provided for the HMD such that when the user removes the HMD, this is detected because the user's signal signature is no longer obtained. At this time, the HMD may move to a non-authenticated state. Access to the resource and/or to interactions with other users for which authorization is needed may then be terminated automatically. In a future session, when the HMD is placed on the head, the system may get re-triggered to restart an authentication process. During this process, known signals are sent from the transmitter and the transformed signals are received at the receiver. The signature from the wireless characteristics that are captured. If the signatures match with a high degree of accuracy (and high confidence of avoid false positives), the user is authenticated in the session. The user and the operating system and application can determine which services are available to the user including social media accounts, financial accounts, private storage, and saved state of games and applications.

An improved computer-implemented method, non-transitory computer-readable medium, method and means for implementing such a method are described. Improvements are described that result in a reliable authentication method. Unlike a username or password, the type of authentication herein described cannot be guessed at or hacked in a traditional manner. Authentication as described herein may require no prompting of the user and no effort by the user. In fact, the authentication process may be transparent to the user. Further, transceivers may be simpler and less expensive than imaging equipment that is often needed to build a facial map, iris image or other such biometric data of a user in biometric identification.

In addition, according to an embodiment, the authentication method herein described may rely on the contours and particularities of the HMD in addition to the features of the face to create the signal channel. Thus, authentication may be safer since it is the user in combination with the HMD that is authenticated. Thus, a user wearing a different HMD may not be authenticated as the same user. This may result in a more secure authentication. Also, it may be guaranteed that the user is currently wearing an HMD, the wearing of which may be required for some applications or to access some resources.

Unlike biometric authentication, which raises legitimate privacy issues when biometric data (e.g., a fingerprint, palm print, iris scan, or face scan) that uniquely identifies a person is stored, the authentication herein described does not necessarily save data that uniquely identifies a person. This is at least in part because the channel signal characteristics of the transmission signal are dependent on the type of head-mounted device being worn. If a person wears a different type of head mounted device, or wears no such device (and some other device performs the methods described herein), then the channel signal characteristics would be totally different. Also, different frequencies and configurations of the transmission signal may yield different channel signal characteristics. Further, in many embodiments, an image or map of a face is not ascertainable from the known signatures alone or the wireless channel characteristics alone. That is, this information may function as a "fingerprint" for a user without the system storing sensitive biometric information that might otherwise be used to impersonate a user, for example (e.g., images of the eyes, face, etc.).

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be effected to the particular embodiments by those of skill in the art without departing from the scope of the present application, which is defined solely by the claims appended hereto.

What is claimed is:

1. A method of user authentication for head mounted displays, the method comprising:
   receiving a request to authenticate a user;
   transmitting a transmission signal by a signal transmitter of a head mounted display worn by the user;
   receiving, by a signal receiver of the head mounted display, an input signal based at least in part on a scattering of the transmission signal off a face of the user;
   performing signal channel processing, based at least in part on the input signal, to obtain wireless channel characteristics having a signal profile imparted at least in part by the scattering of the transmission signal off the face of the user;
   determining, based at least in part on the obtained wireless channel characteristics having the signal profile imparted at least in part by the scattering of the transmission signal off the face of the user, a first signal signature;
   authenticating a user wearing the head mounted display according to the determined first signal signature; and
   in response to the authenticating, transmitting an output indicating that the user is authenticated.

2. The method of claim 1, further comprising automatically generating the request to authenticate in response to identifying an attempt by the user to access a resource; and
   making available the resource to the user based at least in part in response to the authenticating the user.

3. The method of claim 1, further comprising automatically generating the request to authenticate in response to detecting that the head mounted display has been placed on a head of the user.

4. The method of claim 1, further comprising automatically detecting, based on the obtained wireless channel characteristics, that the head mounted display is incorrectly placed on a head of the user; and
   in response to the detecting, causing notification to the user that the head mounted display is incorrectly placed.

5. The method of claim 1, wherein the transmission signal comprises a set of radio signals comprising multiple frequencies transmitted over a preset time interval, and
   wherein the signal transmitter is positioned to direct the transmission signal toward an interior of the head mounted display.

6. The method of claim 5, wherein the signal transmitter comprises a plurality of wireless transmitters comprised in the head mounted display, and
   wherein the signal receiver comprises a plurality of wireless receivers comprised in the head mounted display.

7. The method of claim 1, further comprising:
   receiving, by the signal receiver, a second input signal based on a second transmission signal transmitted by the signal transmitter, wherein the second transmission signal is identical to the first transmission signal;

determining, based on the received second input signal, a second signal signature representing an identifier for a second user wearing the head mounted display; and authenticating the second user according to the second signal signature, wherein the second signal signature is unique relative to the first signal signature.

8. The method of claim 1, wherein the determining the first signature comprises using a machine learning-based embedding technique to identify a pattern in the obtained wireless channel characteristics, and wherein the authentication comprises comparing the first signature against a previously stored signal signature.

9. The method of claim 1, wherein the signal transmitter is positioned to direct the transmission signal toward the face of the user or an interior surface of the head mounted display.

10. A system of user authentication for head mounted displays, the system comprising:

communication circuitry configured to receive a request to authenticate a user; and processing circuitry configured to:

cause transmission of a transmission signal by a signal transmitter of a head mounted display worn by the user;

receive, from a signal receiver of the head mounted display, an input signal based at least in part on a scattering of the transmission signal off a face of the user;

perform signal channel processing, based on the input signal, to obtain wireless channel characteristics having a signal profile imparted at least in part by the scattering of the transmission signal off the face of the user;

determine, based at least in part on the obtained wireless channel characteristics having the signal profile imparted at least in part by the scattering of the transmission signal off the face of the user, a first signal signature;

authenticate a user wearing the head mounted display according to the determined first signal signature; and in response to the authenticating, cause transmitting of an output indicating that the user is authenticated.

11. The system of claim 10, wherein the request to authenticate is automatically generated in response to identifying an attempt by the user to access a resource; and at least in part in response to the request, the resource is made available to the user based on the authenticating of the user.

12. The system of claim 10, wherein the request to authenticate is automatically generated in response detecting that the head mounted display has been placed on a head of the user.

13. The system of claim 10, wherein based on the obtained wireless channel characteristics, incorrect placement of the head mounted display on the head of the user is automatically detected; and in response to the detecting, notification to the user is caused that the head mounted display is incorrectly placed.

14. The system of claim 10, wherein the transmission signal comprises a set of radio signals comprising multiple frequencies transmitted over a preset time interval, and wherein the signal transmitter is positioned to direct the transmission signal toward an interior of the head mounted display.

15. The system of claim 14, wherein the signal transmitter comprises a plurality of wireless transmitters comprised in the head mounted display, and wherein the signal receiver comprises a plurality of wireless receivers comprised in the head mounted display.

16. The system of claim 10, wherein the processing circuitry is configured:

to receive, from the wireless receiver, a second input signal based on a second transmission signal transmitted, wherein the second transmission signal is identical to the first transmission signal;

to determine, based on the received second input signal, a second signal signature representing an identifier for a second user wearing the head mounted display; and to authenticate the second user according to the second signal signature, wherein the second signal signature is unique relative to the first signal signature.

17. The system of claim 10, wherein the first signature is determined using a machine learning-based embedding technique to identify a pattern in the obtained wireless channel characteristics, and wherein the first signature is compared against a previously stored signal signature to authenticate the user.

18. A non-transitory computer-readable medium comprising instructions that, when executed by a processor, are configured to cause control circuitry to:

receive a request to authenticate a user;

cause transmission of a transmission signal by a signal transmitter of a head mounted display worn by the user;

receive, from a signal receiver of the head mounted display, an input signal based at least in part on a scattering of the transmission signal off a face of the user;

perform signal channel processing, based at least in part on the input signal, to obtain wireless channel characteristics having a signal profile imparted at least in part by the scattering of the transmission signal off the face of the user;

determine, based at least in part on the obtained wireless channel characteristics having the signal profile imparted at least in part by the scattering of the transmission signal off the face of the user, a first signal signature;

authenticate a user wearing the head mounted display according to the determined first signal signature; and in response to the authenticating, cause transmitting of an output indicating that the user is authenticated.

19. The medium of claim 18, wherein the request to authenticate is automatically generated in response to identifying an attempt by the user to access a resource; and at least in part in response to the request, the resource is made available to the user based on the authenticating of the user.

20. The medium of claim 18, wherein the request to authenticate is automatically generated in response detecting that the head mounted display has been placed on a head of the user.

* * * * *